Feb. 5, 1952
J. H. WAGGONER
COLORED GLASS FIBER PRODUCTS AND
METHOD OF PRODUCING THEM
Filed June 1, 1949
2,584,763
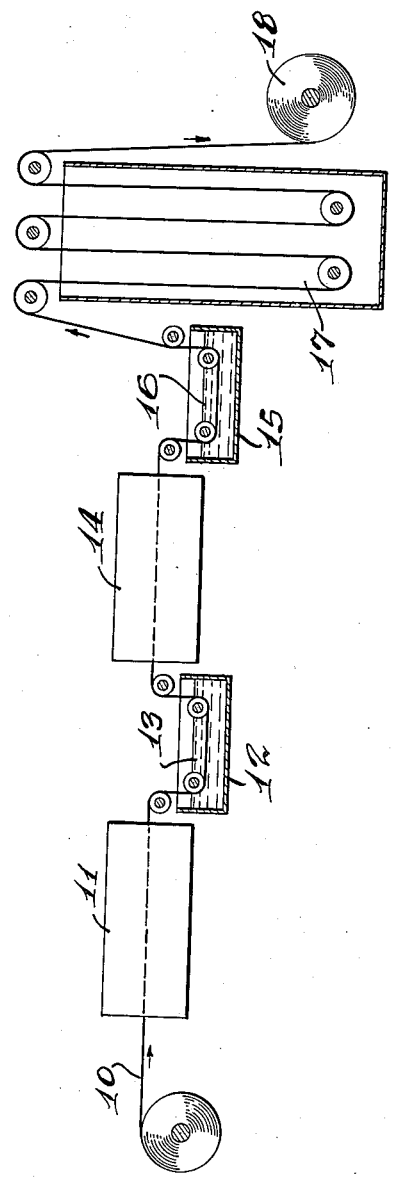
INVENTOR.
JACK H. WAGGONER
BY
Staehli + Overman
ATTYS.

Patented Feb. 5, 1952

2,584,763

UNITED STATES PATENT OFFICE 2,584,763

COLORED GLASS FIBER PRODUCTS AND METHOD OF PRODUCING THEM

Jack H. Waggoner, Newark, Ohio, assignor to Owens-Corning Fiberglas Corporation, a corporation of Delaware Application June 1, 1949, Serial No. 96,611

10 Claims. (Cl. 117—65)

This invention relates to glass fiber products and more particularly to permanently colored glass fibers and glass fiber products and methods for producing the same.

The use of glass fibers as a textile material or in the production of various types of fibrous fabrics has suffered from the difficulty of imparting permanent color and design to glass fibers and fabrics produced therefrom. Color may, of course, be achieved by the formulation of colored batch from which the glass fibers are formed. This technique, however, is impractical because each color gradation calls for a melting tank or furnace of its own from which an infinite amount of fiber of the same color would be drawn; and to provide fibers in sufficient colors to meet the requirements of the textile trade, would result in tremendous inventory in fibers and fiber-fabricating devices. It is more practical to manufacture a single clear fiber and to provide means independent of the fiber-forming process for imparting the desired color or design to the fiber or fabric formed therefrom.

Techniques employed in the dyeing of the common organic fibers such as cotton, wool, silk, nylon, rayon, etc., are not available, as yet, to glass fibers because there is little onto which the dye may anchor. This is because, upon attenuation, glass fibers form into small cylindrical filaments having very smooth void-free surfaces of a hydrophilic nature to which the dye is unable to find sufficient anchorage through physical or chemical bond.

Attempts have been made to color glass fibers by the use of a resinous base coat which is receptive to dyes. While some of the coating resins may serve under normally dry conditions, the adherence of the resinous material to the glass fiber surfaces is greatly weakened in the presence of moisture, and often the coating can be easily stripped from the fiber. Also objectionable in this system is the uneven color distribution and loss of color from the surfaces of the glass fibers because of non-uniform resinous coverage and because of crocking and abrasive wear.

It is an object of this invention to produce colored glass fibers and colored glass fiber fabrics and to provide a method for producing the same.

It is another object to produce permanently and uniformly colored glass fibers that are unaffected by the elements to which it might be exposed, such as moisture, light, heat, abrasion, solvents, soaps and the like.

A further object is to provide a method for coloring glass fibers to predetermined shades independent of the fiber-forming process by reaction of a metallic compound on the glass fiber surfaces to produce a coloring reaction product intimately associated with the glass fibers.

A still further obect is to produce colored glass fiber fabrics having in combination one or more of the characteristics, such as good feel and hand, increased abrasion resistance, resistance to slippage of the weave, decreased sheen or luster, and draping qualities characteristic of the finest silks and woolens.

Another obect is to provide a method for coloring glass fibers in fabric form by the processes adapted to screen or roller printing, practices which were heretofore unavailable to the textile trade in the processing of glass fiber fabrics.

These and other objects and advantages of this invention will hereinafter appear, and for purposes of illustration, but not of limitation, various techniques for carrying out my invention will be shown in the accompanying drawing in which the figure is a schematic diagram showing a system for carrying out my invention.

Briefly described, the concept of my invention resides in the new and novel method for coloring glass fibers by the treatment of the fibers with the salt of a metal having a desirable coloring oxide and thermally reacting the salt, in situ, on the glass fiber surfaces to drive off the non-metallic component, leaving what is believed to be a colored oxide of the corresponding metal or a coloring reaction product of the salt with groupings that predominate on the glass fiber surfaces. The color developed by reaction on the glass fiber surfaces depends upon the particular metallic component in the compound or the combination of metals in one or more compounds, upon the amount or thickness of the reaction layer, as well as, the molecular arrangement to which the metallic salt is converted by heat-treatment, and the atmosphere in which it is reacted. By thermal reaction of the metallic salt on the glass fiber surfaces, coloring products are formed in what appears to be a colloidal arrangement of particles, when the resulting layer is discontinuous, or in the form of a surface film of such thickness that light interference results to give the new sensation of uniform color. Even when reaction provides for discontinuous coloring particles they are in such excellent distribution as to appear as a continuous film on the fibers.

The inorganic nature of the glass fibers, whether in strand or fabric form, encourages the uniform distribution and the anchorage of the coloring reaction product, as by physical or chemical attraction or by intimate association or integration upon reaction with the groupings that predominate on the glass fiber surfaces to resist removal by water or other physical means. The inorganic nature of the coloring reaction product militates against its deterioration or attack by light, heat, chemicals, and light rays to which the fabric might ordinarily be subjected.

Treatment to deposit the coloring reaction product may be carried out with glass fibers of the staple type or of the continuous type in strand, yarn, or fabric form. It may be achieved in conjunction with the fiber-forming process, or preferably by treatment of the fibers subsequent to fiber formation, such as after the fibers have been processed into yarn and cloth. It may be effected with fibers that have been sized during their manufacture with the ordinary gelatin, starch, or resinous compositions. If desired, any such size may first be removed from the fiber surfaces by a solvent or water wash or by burning off in a heat-treatment.

As the metallic salt, use may be made of the soluble salts of organic compounds constituted with a metallic component having coloring oxides. The color is developed by a heat-treatment of the salt on the glass fiber surfaces at a temperature sufficient to drive off the organic portion, leaving the metallic component in what is believed to be a coloring reaction product arranged on the surfaces of the glass filaments or fibers. Suitable organo-metallic salts include the naphthenates, benzoates, octates, rosinates, resinates, the salts of other aliphatic, aromatic and keto-aromatic acids and the metallic soaps of the fatty acids. The metallic component is selected of one or more of the polyvalent metals having coloring oxides, such as copper, manganese, cobalt, cadmium, lead, antimony, vanadium, bismuth, silver, selenium, uranium, and the like. Instead of employing salts of metals having only coloring oxides, salts of metals having white or colorless oxides may be used alone, but they are preferably used in combination with the metallic salts having coloring oxides. For this purpose, the metallic component may be tin, titanium, zinc silicon, aluminum, zirconium, and the like. The reaction products provide for many other desirable characteristics, such as the further separation of fibers as a bulking agent, and they may function as delustering agents or anti-slip agents, which characteristics become a permanent part of the fiber.

Substances such as these may be applied from solution with ordinary organic solvents of the type Stoddard solvent, xylene, naphtha, toluene, coal tar solvents, petroleum solvents, aromatic solvents, ethers, esters, ketones, and the like, or from solution in oils of animal, mineral and vegetable origin. They may be supplied as emulsions or dispersions in organic or aqueous medium, and when such practices are employed, it is possible to use, as the emulsifying agent, a soap formed of a fatty acid and a metallic component of the type previously described, which, upon thermal treatment, becomes a part of the reaction product to accent color development. Sufficient substance is applied from composition containing the salt or soap in concentration ranging from 0.2-20 percent, but it is preferred to use a composition containing about 5 percent by weight of the salt. To secure proper dilution without loading the composition with large amounts of solvent, it is expedient to dilute a base substance formed of high concentration of salts in organic solvent and then disperse the solution as required in aqueous medium. Application to the glass fibers may be made by conventional means, such as dip coating, spraying, brushing, flow coating, roller coating, screen printing, roller printing, and the like.

Application from dilute solution permits substantially full penetration of the glass fiber strands in the yarns, and fabrics. When the salts of aromatic acids such as the naphthenates or benzoates are used, wetting out of the glass surfaces, with or without size, is enhanced. This characteristic is valuable because the penetration and wetting of the fibers by the treating composition is such that it may be applied in the manner of a printing ink, thereby to permit coloring by roller or screen printing; coloring techniques which have heretofore been impractical with glass fiber fabrics.

The temperature for effecting the desired thermal reaction of the salt on the glass fiber surfaces is about 1200 to 1350°, but may go as high as the temperature at which the fibers are softened and fused together. The minimum temperature which it is advantageous to employ is usually above 600° F. but on occasion may go as low as 450° F. under controlled conditions and with corresponding longer exposure. Between these temperatures, various time and temperature combinations may be used, illustrated by reaction for three to five minutes at 600° F. or two to five seconds at 1200° F. Under the more severe of these reaction conditions, such as from 1-2 minutes at 900° F. to 2-5 seconds at 1200° F., a certain amount of weave setting is effected wherein the glass fibers, while in yarn or fabric form, relax and are permanently set in their twisted and woven relation. This gives the textile the hand and flexibility desired for most textile or decorative use. It also is responsible, to an appreciable extent, for the excellent return and crease and wrinkle resistance of the fabric. Fiber relaxation beneficially effects the hand and draping qualities of the fabric which enables it to hang in soft and rippling folds.

Instead of depositing organo-metallic salts on the glass fiber surfaces, desirable coloring reaction products may be secured from the reaction with deposited inorganic metallic salts diluted with solvent or aqueous medium. Representative inorganic metallic salts include metallic components of the type previously pointed out in combination with acidic radicals or constituted within acid radicals of the inorganic type such as the chlorides, nitrates, sulphates, chromates, stannates, vanadanates, ferrites and the like. By way of illustration use may be made of ferric chloride, cupric chloride, stannic chloride, silver nitrate, and chromic chloride. Use may also be made of compounds wherein the metallic component is arranged in the anion such as in the metallic chromates, metallic stannates, and the like.

These inorganic salts may be applied to the glass fibers in various forms by ordinary coating means, such as those previously described, followed by a heat treatment of corresponding intensity and duration.

As previously pointed out the reaction product tends to bulk-up or separate the glass filaments one from another while at the same time imparting the desired color. Additional bulking characteristics may be secured by the incorporation in the treating composition of additional salts which yield corresponding reaction products. These additional substances are generally selected of the salts which produce white or substantially colorless reaction products. Representative are the tin and titanium salts incorporated as the tin or titanium salts of organic acids, the stannates or titanites or as inorganic salts of the type tin nitrate, tin chloride, and the like. Delustering and an increase in the surface coefficient of friction are also achieved by the described treatment. Additional bulking and delustering of a desirable character may be secured by the incorporation into the treating composition of as much as 20 percent colloidal silica or like silicates.

Bulking and delustering as effected by the coloring reaction product, and additionally by the agents just described operate to lubricate the glass fibers and to separate the fibers one from another to impart greater resistance to fiber deterioration. Additional lubrication and protection, when desired, may be achieved by the after-treatment of the colored fibers with oleaginous substances, resins or coating materials. Fluorescence may be achieved by the addition of zinc sulfate or the like to the original treating composition.

EXAMPLE 1

In carrying out my invention, a strand of glass fiber may be dipped into a bath containing a 4 percent concentration of ferric chloride in water. The dipped strands may be dried for subsequent treatment or else immediately exposed to 600–700° F. for three minutes. Under these conditions, the fibers are given a brownish-red tinge. When desired, they may be subsequently further lubricated by the addition of a size of the type including gelatin, starch, organo-silicon compounds, sulphonated oils, and the like.

EXAMPLE 2

In another method of application, illustrated by Figure 1, sized glass fibers in fabric form 10 are passed through a heating oven 11 maintained at a temperature in excess of 650° F. to burn the size from the fibers. The fabric is then led into a dip tank 12 partially filled with a composition 13 formulated with a 2 percent aqueous dispersion of nickel naphthenate originally incorporated as a 70 percent solution of nickel naphthenate in Stoddard solvent. The naphthenate, as previously described, fully wets the fibers uniformly to coat each of the filaments of which the fabric is formed.

The treated fibers upon drying are characterized by a bluish-purple color. From the dip tank the fabric is led through a heating oven 14 to expose the coated fibers to a temperature of 1100° F. for a time sufficient to drive off the organic component and develop the coloring reaction product on the glass fiber surfaces, two seconds being sufficient for such purposes, but more may be required for a heavier fabric. Instead of heating to 1100° F., the coated fabric may be treated at 600° F. for about one minute to develop a color change in which the fibers develop a greenish-yellow color. Other color gradations may be secured by reaction of the nickel naphthenate on the glass fiber surfaces at intermediate temperatures.

If desired, the colored fabric may later be sized or lubricated by immersion in a dip tank 15 containing a composition 16 consisting essentially of starch, gelatin and sulphurated oils in water solution, and then it is advanced through a heated drying tower 17.

Suitable also for colored glass fibers developed in the described manner is a lubricant or size containing 1 or 2 percent of an organo-silicon oil or fluid of the type dimethyl polysiloxane (DC 200 oil) diethyl polysiloxane, lauryl methyl polysiloxane, and the like or various silanes in aromatic naphtha or coal tar solvents. The diluent may be removed from the coating composition by exposure to 250–300° F. for 5–10 minutes in the heating oven and then wound on a roll 18 for distribution. Excellent results are secured when baking temperatures in the order of 600 to 800° F. are used when the fibers are treated with an organo-silicon compound.

The following are examples of other suitable glass fiber treating compositions which may be applied by dipping, flow coating, spraying or brushing to the glass fiber surfaces prior to heat-treatment to develop and set the coloring reaction products:

EXAMPLE 3

Part A 20 parts iron naphthenate
25 parts Stoddard solvent (aromatic solvent)
10 parts oleic acid

Part B 45 parts water
5 parts morpholine

Parts A and B are mixed together prior to submersion of the glass fiber cloth. Upon exposure to 1250° F. for three seconds after first drying at 210–250° F., a light ecru color is developed on the glass fiber surfaces. A protective coating should be after-applied, a suitable coating may contain one part of diethyl polysiloxane fluid emulsified in 13 parts water.

EXAMPLE 4

15 parts iron chloride
70 parts water
5 parts colloidal silica (15 percent in aqueous emulsion)

An ecru color is developed upon reaction at 1200° F. for 5 seconds.

EXAMPLE 5

10 parts cobalt naphthenate
2 parts lead stearate
88 parts naphtha

Glass fibers treated with this composition will develop a blue color upon reaction at 1150° F. for four seconds.

EXAMPLE 6

5 parts iron naphthenate
4 parts iron stearate
3 parts colloidal silica
88 parts water An ecru color will be developed upon reaction at 1050° F. for 10 seconds.

Various shades and complementary coloring effects may be had by the use of a composition or compositions to deposit various combinations of metallic components. For instance, the combination of salts which include chromium iron and zinc will give colors ranging from yellow-brown, red-brown to maroon; cobalt and chromium will give various shades of blue; chromium and tin or titanium will give pink and yellow shades; lead and antimony will tend towards the yellow or ivory, cadmium will give yellow and orange combinations.

It will be apparent from the description that I have produced a new and improved method for providing a durable and permanent color to glass fibers without the necessity of incorporating the coloring elements into the glass fiber batch. By my method, it is possible to color glass fibers and fabrics by a simple impregnating or printing operation and convert the same piece of goods to one of a number of colors by the expedient of selective heat-treatment at predetermined temperatures.

It will be further apparent that the coloring reaction products deposited on the surfaces of the glass fibers of my invention will operate as a lubricating, bulking and anti-slip agent to impart characteristics that have heretofore been difficult to secure in glass fiber fabrics and that at the reaction temperature fiber relaxation of a desirable character may be achieved.

The amount of compounds or salts capable of developing coloring reaction products upon heat-treatment on the glass fiber surfaces may vary over a wide range, depending upon the intensity of color and the degree of delustering, bulking and anti-slip which is desired. However, it is undersirable to load the fibers beyond that portion capable of harmfully affecting the characteristics of the fibers to function as a textile material.

It will be understood that numerous changes may be made in the details of construction, arrangement, and operation without departing from the spirit of my invention, especially as defined in the following claims.

What is claimed is:

1. The method of coloring glass fibers comprising the steps of treating the glass fibers with a dilute solution of an organo metallic salt capable of producing a colored metallic reaction product when subjected to high temperature while on the glass fiber surfaces, and then heating the treated glass fibers to a temperature above 450° F. but below the fusion temperature of the glass composition of which the fibers are formed for a time sufficient to drive off the organic component and leave the metallic component as a colored colloidal reaction product on the glass fiber surface.

2. The method of coloring glass fibers comprising the steps of treating the glass fibers with a dilute composition to coat the glass fibers with an organo metallic salt capable of producing a colored reaction product upon reaction at elevated temperature while on the glass fiber surfaces, and then heating the treated glass fibers at a temperature above 600° F. but below the fusion temperature of the glass composition of which the fibers are formed for a time ranging from several minutes at the lower temperature to a few seconds at the higher.

3. The method of coloring glass fibers comprising the steps of treating the glass fibers with a composition containing 0.2 to 25.0 percent by weight of an organo metallic salt capable of producing a colored reaction product upon decomposition when subjected to high temperature on the glass fiber surfaces, and then heating the treated glass fibers to a temperature above 600° F. but below the fusion temperature of the glass composition of which the fibers are formed for a time ranging from several minutes at the lower temperature to a few seconds at the higher.

4. The method of coloring glass fibers comprising the steps of coating the glass fibers with a composition containing 0.2 to 25.0 percent by weight of an organo metallic salt capable of producing a colored reaction product upon decomposition at elevated temperature on the glass fiber surfaces and up to 20.0 percent by weight of a colorless metal oxide which functions as an anti-slip, delustering, and bulking agent, and then heating the coated glass fibers to a temperature above 600° F. but below 1200° F. for a time ranging from several minutes at the lower temperature to a few seconds at 1200° F.

5. The method of coloring glass fibers comprising the steps of coating the glass fibers with a solution containing 0.2 to 25.0 percent by weight of an organo metallic salt capable of producing a colored reaction product upon decomposition at elevated temperature while on the glass fiber surfaces, heating the coated glass fibers to a temperature above 600° F. but below 1200° F. for a time ranging from several minutes at 600° F. to a few seconds at 1200° F., coating the thermally treated fibers with an organo silicon compound selected from the group consisting of silanes and polysiloxanes, and then heat treating the organo silicon coated fibers at a temperature within the range of 600–800° F. to set the organo silicon on the glass fiber surfaces.

6. Colored glass fibers prepared in accordance with the method set forth in claim 1.

7. Colored glass fibers prepared in accordance with the method set forth in claim 2.

8. Colored glass fibers prepared in accordance with the method set forth in claim 3.

9. Colored glass fibers prepared in accordance with the method set forth in claim 4.

10. Colored glass fibers prepared in accordance with the method set forth in claim 5.

JACK H. WAGGONER.

REFERENCES CITED

The following references are of record in the file of this patent:

UNITED STATES PATENTS

| Number | Name | Date |
|---|---|---|
| 537,245 | Stock et al. | Apr. 9, 1895 |
| 2,245,783 | Hyde | June 17, 1941 |
| 2,392,805 | Biefeld | Jan. 15, 1946 |
| 2,393,530 | Harris | Jan. 22, 1946 |
| 2,433,292 | Perloff | Dec. 23, 1947 |
| 2,444,347 | Greger | June 29, 1948 |

FOREIGN PATENTS

| Number | Country | Date |
|---|---|---|
| 559,068 | Great Britain | Feb. 2, 1944 |